(12) United States Patent
Kim (10) Patent No.: US 9,538,591 B2
(45) Date of Patent: Jan. 3, 2017

(54) LIGHTING APPARATUS

(71) Applicant: SILICON WORKS CO., LTD., Daejeon-si (KR)

(72) Inventor: Yong Geun Kim, Suwon-si (KR)

(73) Assignee: SILICON WORKS CO., LTD., Daejeon-Si (KR)

( * ) Notice: Subject to any disclaimer, the term of this patent is extended or adjusted under 35 U.S.C. 154(b) by 0 days.

(21) Appl. No.: 14/807,023

(22) Filed: Jul. 23, 2015

(65) Prior Publication Data

US 2016/0037599 A1 Feb. 4, 2016

(30) Foreign Application Priority Data

Jul. 29, 2014 (KR) .......................... 10-2014-0096522

(51) Int. Cl.
*H05B 33/08* (2006.01)

(52) U.S. Cl.
CPC ...... *H05B 33/0812* (2013.01); *H05B 33/0827* (2013.01); *Y02B 20/46* (2013.01)

(58) Field of Classification Search
None
See application file for complete search history.

(56) References Cited

U.S. PATENT DOCUMENTS

| | | | | |
|---|---|---|---|---|
| 7,986,107 B2 * | 7/2011 | Weaver | ............... | H05B 33/0812 315/121 |
| 8,174,212 B2 * | 5/2012 | Tziony | ............... | H05B 33/0815 315/122 |
| 8,680,782 B2 * | 3/2014 | Sakuragi | ............... | H05B 33/083 315/185 S |
| 9,167,662 B2 * | 10/2015 | King | ...................... | H05B 37/02 |
| 9,277,616 B1 * | 3/2016 | Jao | ...................... | H05B 33/0827 |
| 2007/0024213 A1 * | 2/2007 | Shteynberg | ........ | H05B 33/0815 315/291 |
| 2011/0109244 A1 * | 5/2011 | Grajcar | ............... | H05B 33/0827 315/294 |
| 2011/0199003 A1 * | 8/2011 | Muguruma | .......... | H05B 33/083 315/122 |
| 2012/0146514 A1 * | 6/2012 | Jeong | ................... | H05B 33/083 315/122 |
| 2012/0280622 A1 * | 11/2012 | Jeong | ................... | H05B 33/083 315/122 |
| 2013/0026923 A1 * | 1/2013 | Athalye | ............... | H05B 33/083 315/113 |

(Continued)

FOREIGN PATENT DOCUMENTS

EP 2 288 234 2/2011
KR 10-2010-0121816 11/2010

(Continued)

*Primary Examiner* — Crystal L Hammond
(74) *Attorney, Agent, or Firm* — Kile Park Reed & Houtteman PLLC (57) ABSTRACT

Provided is a lighting apparatus using an LED as a lighting source. The lighting apparatus may distribute a current corresponding to a rectified voltage to a lighting unit and a secondary current circuit, perform primary light emission at low luminance, and reduce an optical deviation between LED groups through secondary light emission. Thus, the lighting apparatus can reduce an optical deviation corresponding to dimming and one cycle of rectified voltage.

16 Claims, 7 Drawing Sheets

(56) References Cited

U.S. PATENT DOCUMENTS

| | | | |
|---|---|---|---|
| 2013/0043799 A1* | 2/2013 | Siu .................... | H05B 33/0824 |
| | | | 315/193 |
| 2013/0099670 A1* | 4/2013 | Jin ..................... | H05B 33/0815 |
| | | | 315/120 |
| 2013/0187551 A1* | 7/2013 | Choy ................. | H05B 33/0809 |
| | | | 315/122 |
| 2014/0300274 A1* | 10/2014 | Acatrinei ........... | H05B 33/0815 |
| | | | 315/85 |
| 2015/0373792 A1* | 12/2015 | Kim .................... | H05B 33/083 |
| | | | 315/201 |

FOREIGN PATENT DOCUMENTS

| | | |
|---|---|---|
| KR | 10-2012-0018773 | 3/2012 |
| KR | 10-1270711 | 6/2013 |

* cited by examiner

LIGHTING APPARATUS

BACKGROUND

1. Technical Field

The present disclosure relates to a lighting apparatus, and more particularly, to a lighting apparatus using an LED as a light source.

2. Related Art

In order to reduce energy, a lighting apparatus is designed to use a light source having high light emission efficiency based on a small amount of energy. Representative examples of a light source used in the lighting apparatus may include a light emitting diode (LED). The LED is differentiated from other light sources in terms of various aspects such as energy consumption, lifetime, and light quality.

Since the LED is driven by a current, a lighting apparatus using the LED as a light source requires a large number of additional circuits for current driving. In order to solve the above-described problem, an AC direct-type lighting apparatus has been developed to provide an AC voltage to the LED.

The AC direct-type lighting apparatus is configured to convert an AC voltage into a rectified voltage, and control the LED to emit light through current driving using the rectified voltage. Since the AC direct-type lighting apparatus directly uses a rectified voltage without using an inductor and capacitor, the AC direct-type lighting apparatus has a satisfactory power factor. The rectified voltage indicates a voltage obtained by full-wave rectifying an AC voltage.

The AC direct-type lighting apparatus includes one or more LED groups, and each of the LED groups includes one or more LEDs. Furthermore, the AC-direct type lighting apparatus may include a dimmer for dimming.

The lighting apparatus may turn on or off the LED groups in response to a change of a rectified voltage, and the luminance of the lighting apparatus may be controlled by dimming.

Typically, the lighting apparatus includes a plurality of LED groups connected in series. According to the change of the rectified voltage, a part of the LED groups may be turned on, and the other part of the LED groups may be turned off. Thus, an optical deviation corresponding to the change of the rectified voltage may occur. When light emission is performed in response to a rectified voltage controlled at a full angle, a significant optical deviation may occur.

Furthermore, the dimmer has a non-uniform operation characteristic. That is, when the phase angle of the rectified voltage is controlled through the dimmer, it is difficult to precisely control luminance. Then, a dimming deviation may occur, and an optical deviation may occur according to the dimming deviation.

The AC direct-type lighting apparatus needs to solve the problem in which an optical deviation occurs, in order to provide high-quality lighting.

SUMMARY

Various embodiments are directed to a lighting apparatus in which a lighting unit including one or more LED groups performs primary light emission and secondary light emission using a rectified voltage, thereby reducing an optical deviation between the respective LED groups.

Also, various embodiments are directed to a lighting apparatus which is capable of reducing an optical deviation between LED groups which are sequentially turned on and off in response one cycle of rectified voltage.

Also, various embodiments are directed to a lighting apparatus which is capable of reducing an optical deviation which occurs when a dimmer is used to control a phase angle.

Also, various embodiments are directed to a lighting apparatus which is capable of distributing a current corresponding to a rectified voltage to a lighting unit and secondary current sources, and reducing an optical deviation corresponding to dimming and one cycle of rectified voltage through primary light emissions of LED groups according to changes of the rectified voltage and secondary light emissions using currents distributed to the secondary current sources.

In an embodiment, a lighting apparatus may include: a lighting unit including a plurality of LED groups each having one or more LEDs and configured to emit light in response to a rectified voltage, the plurality of LED groups including a first LED group which first emits light in response to the rectified voltage and provides a path for a first current; a driving circuit configured to provide one or more current paths to the plurality of LED groups, the one or more current paths being changed in response to a change of the rectified voltage; and one or more secondary current sources coupled to one or more of the plurality of LED groups excluding the first LED group, and each configured to provide a second current which differs according to the change of the rectified voltage. The LED group coupled to the secondary current source may perform primary light emission using the first current and the second current in response to the rectified voltage having a level equal to or more than the level which the first current provided through the first LED group reaches, and perform secondary light emission using the second current in response to the rectified voltage having a lower level than the level for the primary light emission.

In another embodiment, a lighting apparatus may include: a lighting unit including a plurality of LED groups each having one or more LEDs, and configured to emit light in response to a rectified voltage, the plurality of LED groups including a first LED group which first emits light in response to the rectified voltage and provides a path for a first current; a driving circuit configured to provide one or more current paths to the plurality of LED groups, the one or more current paths being changed in response to a change of the rectified voltage; and one or more secondary current sources coupled to one or more of the plurality of LED groups excluding the first LED group, and each configured to provide a constant amount of second current in response to the rectified voltage having a level at which the first current provided through the first LED group reaches the LED group coupled thereto, and provide the second current which increases or decreases in response to a change of the rectified voltage having a lower level than the level at which the first current reaches the LED group coupled thereto. The LED group coupled to the secondary current source may perform primary light emission using the first current and the second current in response to the level of the rectified voltage equal to or more than the level which the first current reaches, and perform secondary light emission using the second current in response to the rectified voltage lower than the level which the first current reaches.

In another embodiment, a lighting apparatus may include: a lighting unit including a plurality of LED groups each having one or more LEDs, and configured to emit light in response to a rectified voltage, the plurality of LED groups including a first LED group which first emits light in response to the rectified voltage and provides a path for a first current; a driving circuit configured to provide one or more current paths to the plurality of LED groups, the one or more current paths being changed in response to a change of the rectified voltage; and one or more secondary current sources coupled to one or more of the plurality of LED groups excluding the first LED group, and each configured to provide a constant amount of second current. The LED group coupled to the secondary current source may perform primary light emission using the first current and the second current in response to the rectified voltage having a level equal to or more than the level which the first current provided through the first LED group reaches, and perform secondary light emission using the second current in response to the rectified voltage having a lower level than the level which the first current reaches.

DETAILED DESCRIPTION

Exemplary embodiments will be described below in more detail with reference to the accompanying drawings. The disclosure may, however, be embodied in different forms and should not be construed as limited to the embodiments set forth herein. Rather, these embodiments are provided so that this disclosure will be thorough and complete, and will fully convey the scope of the disclosure to those skilled in the art. Throughout the disclosure, like reference numerals refer to like parts throughout the various figures and embodiments of the disclosure.

A lighting apparatus in accordance with an embodiment of the present invention may include a lighting unit, a driving circuit, and a secondary current circuit.

The lighting unit may include a plurality of LED groups each having one or more LEDs, and emit light in response to a rectified voltage. The plurality of LED groups may include a first LED group which first emits light in response to a rise of the rectified voltage. The driving circuit may be configured to provide one or more current paths to the plurality of LED groups, the one or more current paths being changed in response to the change of the rectified voltage.

The secondary current circuit may include one or more secondary current sources. The secondary current source may be coupled to one or more of the LED groups excluding the first LED group, and configured to provide a current which differs according to the change of the rectified voltage, for secondary light emission.

According to the above-described configuration, a current corresponding to the rectified voltage may be distributed and supplied to the lighting unit and the secondary current circuit. At this time, the current passing through the first LED group within the lighting unit may be defined as a first current, and the current provided to the respective LED groups from the secondary current sources included in the secondary current circuit may be defined as a second current. The lighting unit may perform primary light emission and secondary light emission. The primary light emission may be performed by an LED group receiving the first and second currents, and the secondary light emission may be performed by an LED group receiving only the second current. Furthermore, an LED group receiving the first current may perform primary light emission, and an LED group which does not perform primary light emission may perform secondary light emission using the second current. Thus, an optical deviation corresponding to dimming and one cycle of the rectified voltage may be reduced by the operation of the secondary current circuit.

The driving circuit may provide current paths for primary light emission and secondary light emission, and perform current regulation on the current paths.

The secondary current sources may be coupled to the LED groups excluding the first LED group.

The secondary current source provides the second current at the same time as the first LED group emits light or after the first LED group emits light.

The secondary current source may provide a constant amount of second current while the level of the rectified voltage is maintained at more than the level at which the first current can reach the LED group coupled thereto, or provide a second current which increases or decreases in response to the change of the rectified voltage, when the level of the rectified voltage is lower than the level at which the first current can reach the LED group coupled thereto. At this time, when the level of the rectified voltage is maintained at more than the level at which the first current can reach the LED group coupled to the secondary current source, the secondary current source may provide the constant amount of second current corresponding to the level of the rectified voltage, at which the first current can reach the LED group coupled thereto.

Furthermore, the secondary current source may provide the constant amount of second current while the level of the rectified voltage is maintained at more than the level at which the first current can reach the LED group coupled thereto.

At this time, each of the secondary current sources may be coupled to two or more LED groups, and provide the second current while the level of the rectified voltage is maintained at more than the level at which the first current can reach the LED groups coupled thereto.

Furthermore, the secondary current source may be configured to provide the second current in response to a preset voltage, and use a voltage applied to the first LED group as the preset voltage.

In the following descriptions, an NPN transistor may indicate an NPN bipolar transistor, and a PNP transistor may indicate a PNP bipolar transistor.

Figure 1:
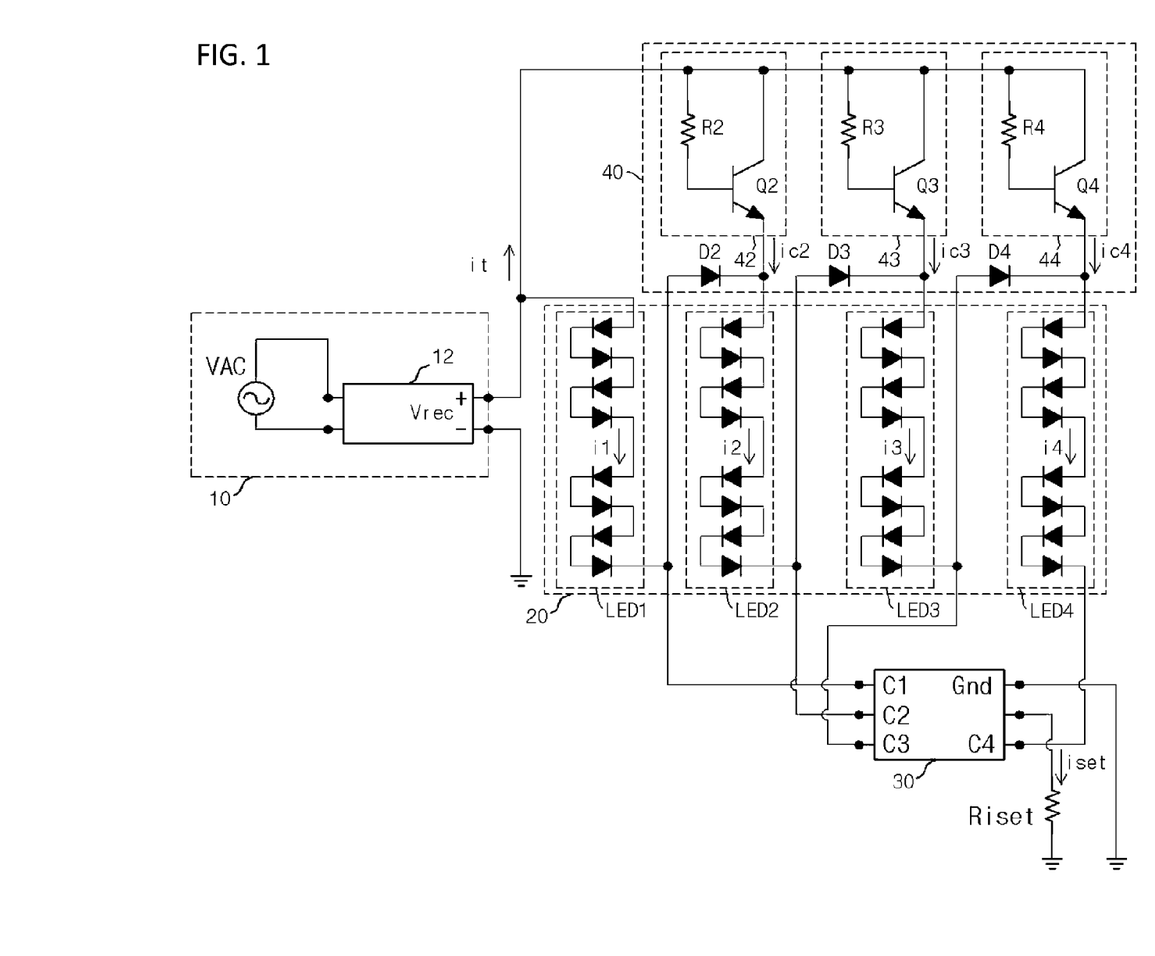
FIG. 1 is a block diagram illustrating a lighting apparatus in accordance with an embodiment of the present invention.

The lighting apparatus using an NPN transistor in accordance with an embodiment of the present invention may be configured as illustrated in FIG. 1.

The embodiment of FIG. 1 may include a power supply circuit 10, a lighting unit 20, a driving circuit 30, and a secondary current circuit 40.

The power supply circuit 10 may be configured to provide a rectified voltage Vrec. For this operation, the power supply circuit 10 may include an AC power supply VAC and a rectifier 12. The AC power supply VAC may be implemented with a common AC power supply, and provide an AC voltage. The rectifier 12 may output the rectified voltage Vrec by full-wave rectifying an AC voltage of the AC power supply VAC. The rectifier 12 may have a typical bridge diode structure.

The rectified voltage Vrec provided from the power supply circuit 10 may have a ripple corresponding to a half cycle of the AC voltage. Hereafter, a change of the rectified voltage Vrec in the embodiment of the present invention is defined as an increase/decrease of the ripple.

Although not illustrated, the power supply circuit 10 may include a dimmer, and the dimmer may include a TRIAC. The dimmer may control the phase of the rectified voltage Vrec by performing phase cut for the AC voltage. That is, the dimmer may control the phase of the rectified voltage Vrec and perform a dimming operation to control the amount of current provided to the lighting unit 20. As a result, the luminance of the lighting unit 20 may be controlled through current control based on the dimming operation.

The current corresponding to the rectified voltage Vrec of the power supply circuit 10 may be distributed and provided to the lighting unit 20 and the secondary current circuit 40.

The lighting unit 20 may emit light in response to the rectified voltage Vrec, and include a plurality of LEDs. The plurality of LEDs included in the lighting unit 20 may be divided into a plurality of LED groups, and FIG. 1 illustrates that the lighting unit 20 includes four LED groups LED1 to LED4 connected in series. The number of LED groups may be set to various values according to a designer's intention. Furthermore, each of the LED groups LED1 to LED4 may include one or more LEDs or a plurality of LEDs connected in series, in parallel, or in serial-parallel to each other. FIG. 1 illustrates that each of the LED groups LED1 to LED4 includes eight LEDs connected in series.

Each of the LEDs may have an operating voltage, and each of the LED groups may have an operating voltage which is proportional to the number of LEDs included therein. The LED groups connected in series to each other may have a light emission voltage corresponding to the sum of operating voltages of the respective LED groups. More specifically, when each of the LED groups LED1 to LED4 connected in series has an operating voltage of 60V, the LED group LED1 may emit light at 60V, the LED groups LED1 and LED2 may emit light at 120V, the LED groups LED1 to LED3 may emit light at 180V, and the LED groups LED1 to LED4 may emit light at 240V. At this time, 60V at which the LED group LED1 emits light may be defined as the light emission voltage V1 of the LED group LED1, 120V at which the LED groups LED1 and LED2 emit light may be defined as the light emission voltage V2 of the LED group LED2, 180V at which the LED groups LED1 to LED3 emit light may be defined as the light emission voltage V3 of the LED group LED3, and 240V at which the LED groups LED1 to LED4 emit light may be defined as the light emission voltage V4 of the LED group LED4.

The light emission voltage V2 may correspond to a rectified voltage Vrec having a level at which the first current provided through the LED group LED1 can reach the LED group LED2, the light emission voltage V3 may correspond to a rectified voltage Vrec having a level at which the first current provided through the LED group LED1 can reach the LED group LED3, and the light emission voltage V4 may correspond to a rectified voltage Vrec having a level at which the first current provided through the LED group LED1 can reach the LED group LED4. Between the respective LED groups LED1 to LED4, forward diodes D2, D3, and D4 may be formed to prevent a reverse flow of current. The diodes D2 to D4 may be included in secondary current sources 42 to 44, respectively, and the operation thereof will be described below in detail.

The secondary current circuit 40 may include secondary current sources 42 to 44 coupled to the LED groups LED2 to LED4 excluding the LED group LED1 which first emits light, among the LEDs LED1 to LED4. Unlike the configuration of FIG. 1, a secondary current source may be coupled only to the LED groups LED3 and LED4 or the LED group LED4. Such a configuration may be determined in consideration of an optical deviation, according to a designer's intention.

The secondary current sources 42 to 44 may provide the second current to the respective LED groups LED2 to LED4 coupled thereto through the operations of NPN transistors Q2 to Q4 to which the rectified voltage Vrec is applied. At this time, each of the secondary current sources 42 to 44 may provide a constant amount of second current to the LED group coupled thereto, when the level of the rectified voltage Vrec is equal to or higher than the level at which the first current can reach the LED group coupled thereto, or provide a second current which increases/decreases in response to the change of the rectified voltage Vrec, when the level of the rectified voltage Vrec is lower than the level at which the first current can reach the LED group coupled thereto.

Representatively, the secondary current source 42 may include an NPN transistor Q2 and a resistor R2 to which the rectified voltage Vrec is applied. The NPN transistor Q2 may include a collector configured to receive the rectified voltage Vrec, a base connected to one end of the resistor R2, and an emitter connected to an input terminal of the LED group LED2. The secondary current sources 43 and 44 may also include NPN transistors Q3 and Q4 and resistors R3 and R4, respectively, and have the same configuration as the secondary current source 43. Thus, the duplicate descriptions thereof are omitted herein.

The driving circuit 30 may provide a current path for light emission of the lighting unit 20.

More specifically, the driving circuit 30 may be configured to provide a current path to the LED groups LED1 to LED4 in response to light emission of the lighting unit 20 through the change of the rectified voltage Vrec, and perform current regulation on the current path.

For this operation, the driving circuit 30 may include terminals C1 to C4 connected to the respective output terminals of the LED groups LED1 to LED4 included in the lighting unit 20. The driving circuit 30 may be connected to a sensing resistor Riset for forming a current path. The voltage applied to the sensing resistor Riset may be referred to as a sensing voltage, and a current flowing through the sensing resistor Riset may be referred to as a sensing current.

The driving circuit 30 may use a sensing voltage of the sensing resistor Riset in order to provide a current path. The driving circuit 30 may compare a sensing voltage corresponding to a current iset flowing through the sensing resistor Riset to internal reference voltages provided to the respective LED groups LED1 to LED4. According to the comparison results between the sensing voltage and the reference voltages, the driving circuit 30 may provide current paths for connecting the sensing resistor Riset to the respective terminals C1 to C4.

The rectified voltage Vrec provided to the lighting unit 20 may have a ripple which periodically increases/decreases.

When the rectified voltage Vrec rises over the light emission voltage V1, the LED group LED1 may primarily emit light. When the rectified voltage Vrec rises over the light emission voltage V2, the LED groups LED1 and LED2 may primarily emit light. When the rectified voltage Vrec rises over the light emission voltage V3, the LED groups LED1 to LED3 may primarily emit light. When the rectified voltage Vrec rises over the light emission voltage V4, the LED groups LED1 to LED4 may primarily emit light.

The number of current paths provided by the driving circuit 30 and the sensing resistor Riset and the current amounts on the respective current paths may be changed in a stepwise manner in response to the sequential primary light emissions of the LED groups LED1 to LED4. The current on a current path may be changed while having a stepped waveform which rises or falls in a stepwise manner in response to the change of the rectified voltage Vrec. Furthermore, the change of the entire current provided to the lighting unit 20 may be defined as the same as the sensing current iset of the sensing resistor Riset, and sensed through the sensing voltage of the sensing resistor Riset. The sensing current iset of the sensing resistor Riset may be controlled to a constant current corresponding to the current sum of primary light emissions and secondary light emissions of the LED groups LED1 to LED4.

That is, when the rectified voltage Vrec rises, the number of LED groups to primarily emit light may increase, and when the rectified voltage Vrec falls, the number of LED groups to primarily emit light may decrease. The driving circuit 30 may provide a changed current path in response to the change in primary light emitting state of the lighting unit 20, and the current on the current path for primary light emission may be changed in a stepwise manner.

The driving circuit 30 which provides a current path and performs current regulation as described above may be configured as illustrated in FIG. 2.

Figure 2:
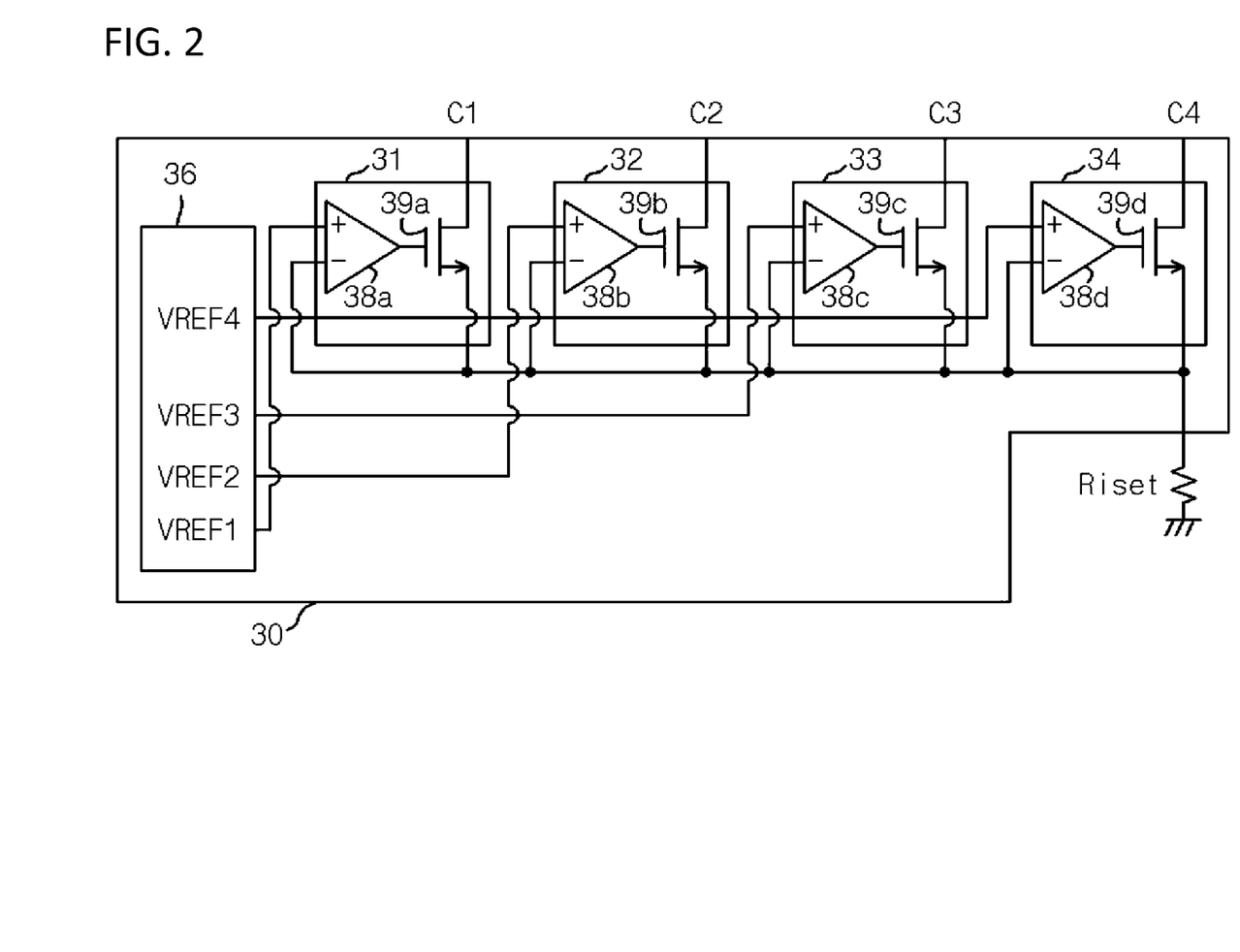
FIG. 2 is a detailed circuit diagram illustrating a driving circuit of FIG. 1.
Figure 3:
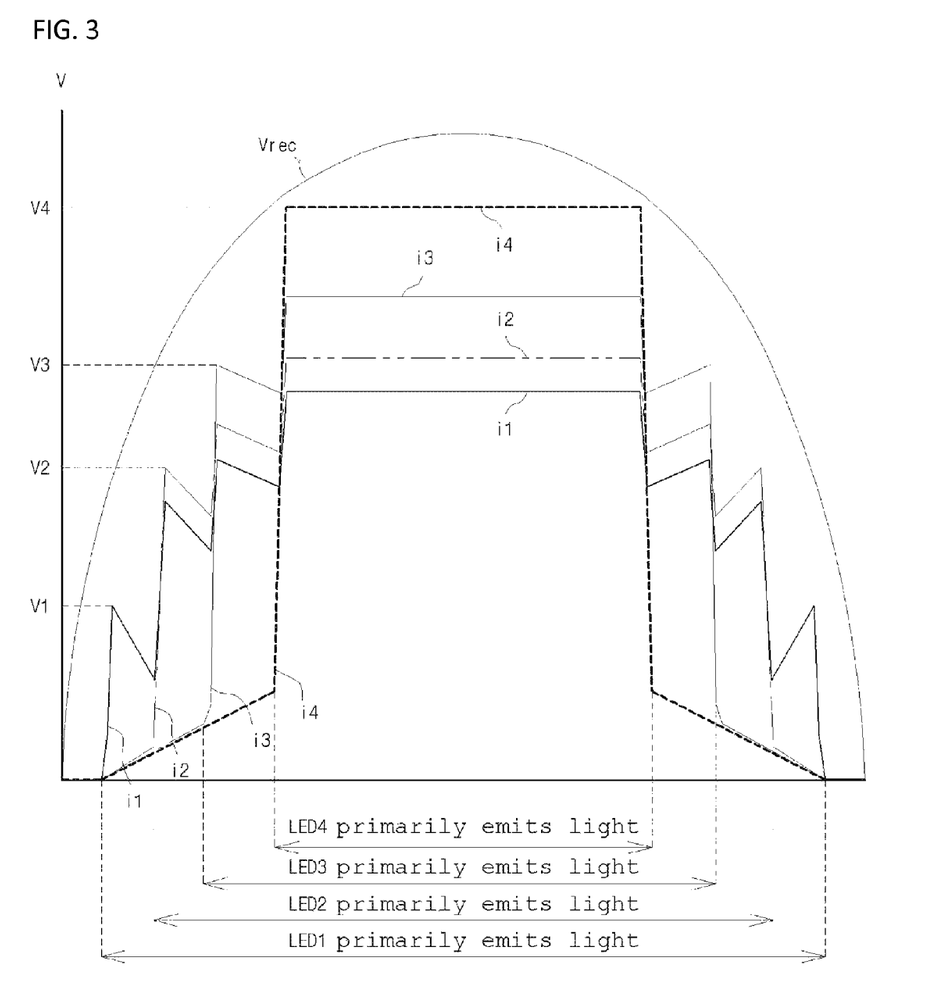
FIG. 3 is a waveform diagram for describing an input current for each LED group corresponding to a rectified voltage in accordance with the embodiment of FIG. 1.
Figure 4:
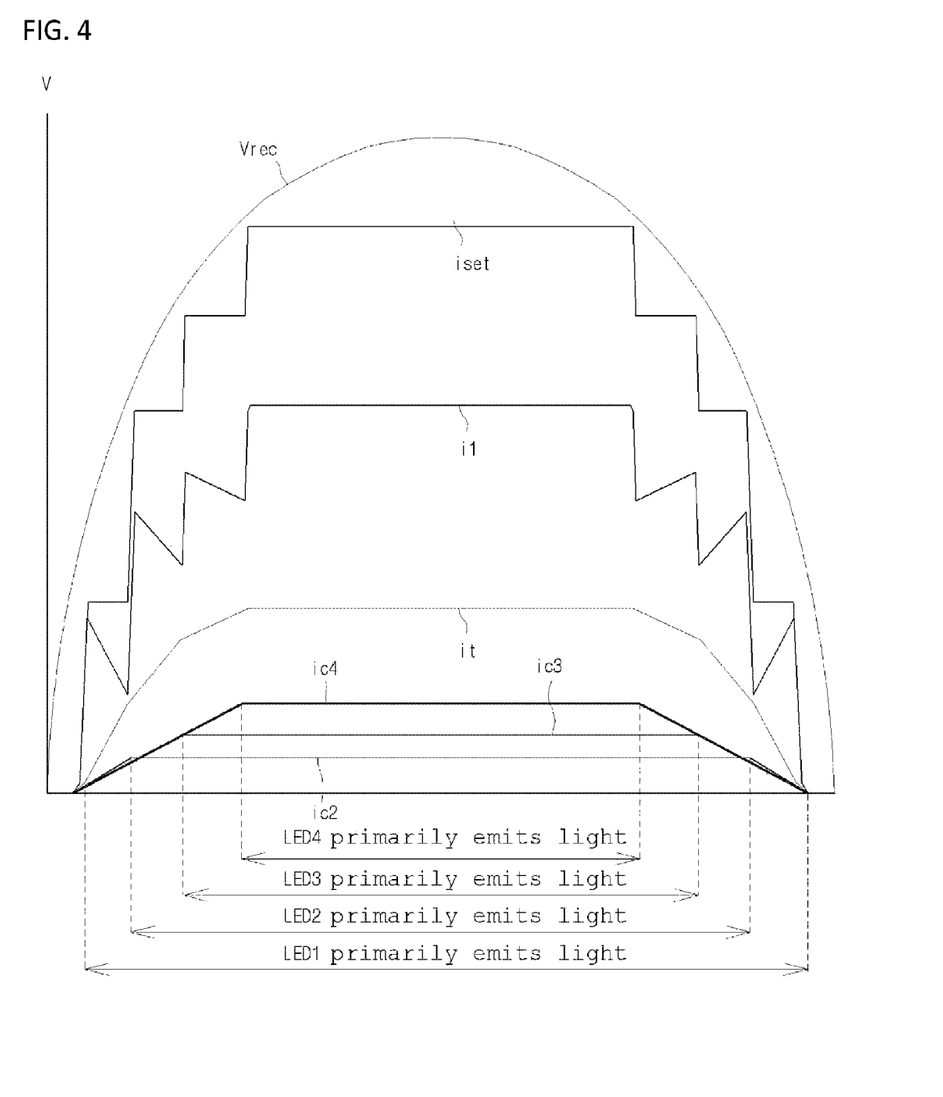
FIG. 4 is a waveform diagram illustrating secondary currents, an input current of a lighting unit, and a sensing current in accordance with the embodiment of FIG. 1.

The driving circuit 30 may include a plurality of switching circuits 31 to 34 and a reference voltage supply unit 36. The plurality of switching circuits 31 to 34 may be configured to provide a current path for the LED groups LED1 to LED4, and the reference voltage supply unit 36 may be configured to provide the reference voltages VREF1 to VREF4.

The reference voltage supply unit 36 may be configured to provide the reference voltages VREF1 to VREF4 having different levels according to a designer's intention.

The reference voltage supply unit 36 may include a plurality of resistors which are connected in series to each other and receive a constant voltage, for example. The reference voltage supply unit 36 may output the reference voltages VREF1 to VREF4 having different levels through corresponding nodes among the resistors. In another embodiment, the reference voltage supply unit 36 may include independent voltage supply sources for providing the reference voltages VREF1 to VREF4 having different levels.

Among the reference voltages VREF1 to VREF4 having different levels, the reference voltage VREF1 may have the lowest voltage level, and the reference voltage VREF4 may have the highest voltage level. The voltage level may gradually increase in order of VREF1, VREF2, VREF3, and VREF4.

The reference voltage VREF1 may have a level for turning off the switching circuit 31 at the point of time that the LED group LED2 primarily emits light. More specifically, the reference voltage VREF1 may be set to a lower level than the sensing voltage which is formed in the sensing resistor Riset at the point of time that the LED group LED2 primarily emits light.

The reference voltage VREF2 may have a level for turning off the switching circuit 32 at the point of time that the LED group LED3 primarily emits light. More specifically, the reference voltage VREF2 may be set to a lower level than the sensing voltage which is formed in the sensing resistor Riset at the point of time that the LED group LED3 primarily emits light.

The reference voltage VREF3 may have a level for turning off the switching circuit 33 at the point of time that the LED group LED4 primarily emits light. More specifically, the reference voltage VREF3 may be set to a lower level than the sensing voltage which is formed in the sensing resistor Riset at the point of time that the LED group LED4 primarily emits light.

The reference voltage VREF4 may be set in such a manner that the current flowing through the sensing resistor Riset becomes a constant current in the upper limit-level region of the rectified voltage Vrec.

The switching circuits 31 to 34 may be commonly connected to the sensing resistor Riset for providing a sensing voltage, in order to perform current regulation and form a current path.

The switching circuits 31 to 34 may compare the sensing voltage of the sensing resistor Riset to the reference voltages VREF1 to VREF4 of the driving circuit 30, and form one or more current paths for primary light emission and secondary light emission.

Each of the switching circuits 31 to 34 may receive a high-level reference voltage, as the switching circuit is connected to an LED group remote from the position to which the rectified voltage Vrec is applied.

The switching circuits 31 to 34 may include comparators 38a to 38d and switching elements, respectively, and the switching elements may include NMOS transistors 39a to 39d, respectively.

Each of the comparators 38a to 38d of the switching circuits 31 to 34 may have a positive input terminal (+) configured to receive a reference voltage, a negative input terminal (−) configured to receive a sensing voltage, and an output terminal configured to output a result obtained by comparing the reference voltage and the sensing voltage.

The NMOS transistors 39a to 39d of the respective switching circuits 31 to 34 may perform a switching operation according to the outputs of the comparators 38a to 38d, which is applied through the gates thereof. The drains of the respective NMOS transistors 39a to 39d and the negative input terminals (−) of the respective comparators 38a to 38d may be commonly connected to the sensing resistor Riset.

According to the above-described configuration, the sensing resistor Riset may apply the sensing voltage to the input terminals (−) of the comparators 38a to 38d, and provide current paths corresponding to the NMOS transistors 39a to 39d of the respective switching circuits 31 to 34.

In the lighting apparatus in accordance with the embodiment of the present invention, the LED groups LED1 to LED4 may sequentially emit light in response to the changes of the rectified voltage Vrec, and current paths corresponding to the sequential light emissions of the LED groups LED1 to LED4 may be provided through the driving circuit 30.

The operation of the lighting apparatus in accordance with the embodiment of FIG. 1 will be described with reference to FIGS. 1 to 4.

First, the lighting unit 20 may receive a current corresponding to the rectified voltage Vrec. The LED groups LED2 to LED4 of the lighting unit 20 may receive second currents ic2 to ic4 from the secondary current sources 42 to 44, respectively. That is, the secondary current it provided from the secondary current circuit 40 may be defined as the sum of the second currents ic2 to ic4. Furthermore, the current provided from the power supply circuit 10, that is, the rectifier 12 may be defined as the sum of the secondary current it and the first current i1 passing through the LED group LED1 of the lighting unit 20. The above-described current provided from the rectifier 12 may be defined as the same as the sensing current iset. The first currents of the respective LED groups LED1 to LED4 may be represented by i1, i2, i3, and i4. At this time, i4 may be defined as ic4+i3, i3 may be defined as ic3+i2, and i2 may be defined as ic2+i1.

First, the operation of the secondary current sources 42 to 44 will be described. The second currents ic2 to ic4 of the secondary current sources 42 to 44 may be determined by the magnitudes of the resistors R2 to R4, the rectified voltage Vrec, and the light emission voltages of the LED groups coupled thereto, respectively.

The secondary current sources 42 to 44 may be configured to start supplying the second current in response to the rectified voltage Vrec equal to or more than the light emission voltage of the LED group LED1 which first emits light. The point of time that the supply of the second current is started may be set to various points by a designer, regardless of the light emission voltage of the LED group LED1.

Each of the secondary current sources 42 to 44 may provide the second current which increases/decreases in response to the rise/fall of the rectified voltage Vrec, when the rectified voltage Vrec is lower than the light emission voltage of the LED group coupled thereto, that is, in response to the rectified voltage Vrec having a lower level than the level at which the first current provided through the LED group LED1 can reach the LED group coupled thereto. In this case, each of the secondary current sources 42 to 44 may provide the second current having an increasing slope while the rectified voltage Vrec rises to the light emission voltage of the LED group coupled thereto, and provide the second current having a decreasing slope while the rectified voltage Vrec falls below the light emission voltage of the LED group coupled thereto.

On the other hand, each of the secondary current sources 42 to 44 may provide a constant level of secondary current in a state where the LED group coupled thereto primarily emits light. That is, each of the secondary current sources 42 to 44 may provide the constant amount of second current corresponding to the level of the rectified voltage, at which the first current can reach the LED group coupled thereto, when the rectified voltage is maintained at more than the light emission voltage of the LED group coupled thereto, that is, when the level of the rectified voltage is maintained at more than the level at which the first current provided through the LED group LED1 can reach the LED group coupled thereto. That is, each of the secondary current sources 42 to may provide the constant amount of secondary current corresponding to the fixed voltage value.

Hereafter, the operation of the driving circuit 30 and the primary light emissions of the respective LED groups LED1 to LED4 based on the changes of the rectified voltages Vrec will be described with reference to FIGS. 1 to 4.

When the rectified voltage Vrec is in the initial state, the switching circuits 31 to 34 may maintain a turn-on state because the reference voltages VREF1 to VREF4 applied to the positive input terminals (+) thereof are higher than the sensing voltage of the resistor Riset, which is applied to the negative input terminals (−) thereof.

When the rectified voltage Vrec is in the initial state, the LED groups LED1 to LED4 may not emit light, and the secondary current sources 42 to 44 may not supply the second current either, because the turn-on condition is not satisfied.

Then, when the rectified voltage Vrec rises to reach the light emission voltage V1, the LED group LED1 may primarily emit light. The first current i1 may be applied as a current for primary light emission of the LED group LED1. Then, when the LED group LED1 of the lighting unit 20 primarily emits light, the switching circuit 31 connected to the LED group LED1 may provide a current path for primary light emission.

When the rectified voltage Vrec reaches the light emission voltage V1 such that the LED group LED1 primarily emits light and the current path is formed through the switching circuit 31, the first current i1 increased to a predetermined level may be provided to the LED group LED1.

Furthermore, when the rectified voltage Vrec reaches the light emission voltage V1, the secondary current sources 42 to may start supplying the second currents ic2 to ic4 corresponding to the rectified voltage Vrec, because the turn-on condition is satisfied.

At this time, since the sensing voltage of the sensing voltage Riset has a low level, the switching circuits 31 to 34 may maintain the turn-on state.

In response to the primary light emission of the LED group LED1, the first current i1 may flow into a path passing through the LED group LED1, the switching circuit 31 of the driving circuit 30, and the sensing resistor Riset.

Simultaneously, the second currents ic2 to ic4 of the secondary current sources 42 to 44 may flow into paths passing through the respective LED groups LED2 to LED4, the respective switching circuits 32 to 34 of the driving circuit 30, and the sensing resistor Riset. The LED groups LED2 to LED4 may secondarily emit light using the second currents ic2 to ic4.

Then, when the rectified voltage Vrec continuously rises, the second currents ic2 to ic4 of the secondary current sources 42 to 44 may gradually increase. At this time, the first current i1 passing through the LED group LED1 may gradually decrease by the amount of the distributed second currents ic2 to ic4 of the secondary current sources 42 to 44.

The LED group LED1 may primarily emit light at a luminance corresponding to the change of the first current i1, and the LED groups LED2 to LED4 may secondarily emit light at luminances corresponding to the second currents ic2 to ic4.

Until the rectified voltage Vrec reaches the light emission voltage V2, the LED group LED1 may emit light in response to the change of the first current i1. Then, the luminance of the LED group LED1 may gradually decrease. On the other hand, the luminances of the LED groups LED2 to LED4 may gradually increase in response to the changes of the second currents ic2 to ic4. That is, while the entire luminance is maintained, an optical deviation between the respective LED groups may be reduced.

Then, when the rectified voltage Vrec continuously rises to reach the light emission voltage V2, the LED group LED2 may primarily emit light. The first current i2 may be applied as a current for the primary light emission of the LED group LED2. When the LED group LED2 primarily emits light, the switching circuit 32 connected to the LED group LED2 may provide a current path for the primary light emission. At this time, the LED group LED1 may also maintain the light emitting state.

When the rectified voltage Vrec reaches the light emission voltage V2 such that the LED group LED2 primarily emits light and the current path is formed through the switching circuit 32, the level of the sensing voltage of the sensing resistor Riset may rise. At this time, the sensing voltage may have a higher level than the reference voltage VREF1. Therefore, the NMOS transistor 39a of the switching circuit 31 may be turned off by an output of the comparator 38a. That is, the switching circuit 31 may be turned off, and the switching circuit 32 may provide a current path corresponding to the primary light emission of the LED group LED2.

Furthermore, when the rectified voltage Vrec reaches the light emission voltage V2, the voltage for the primary light emission of the LED group LED2, that is, the light emission voltage V2 may be applied between the collector and emitter of the NPN transistor Q2 of the secondary current source 42. Although the rectified voltage Vrec rises over the light emission voltage V2, the state in which the light emission voltage V2 is applied may be maintained between the collector and emitter of the NPN transistor Q2 of the secondary current source 42. That is, although the rectified voltage Vrec rises over the light emission voltage V2, the fixed voltage may be applied to the secondary current source 42. Thus, the secondary current source 42 may provide the constant amount of second current ic2. On the other hand, the secondary current sources 43 and 44 may provide the second currents ic3 and ic4 which increase in response to the changes of the rectified voltage Vrec, until the rectified voltage Vrec reaches the light emission voltages of the LED groups LED3 and LED4 coupled thereto.

As described above, when the rectified voltage Vrec rises to the light emission voltage V3 after reaching the light emission voltage V2, the first current i2 may flow into a current path passing through the LED group LED2, the switching circuit 32 of the driving circuit 30, and the sensing resistor Riset, in response to the primary light emission of the LED group LED2. At this time, the first current i1 may follow the increased amount of the first current i2.

Simultaneously, the second current ic2 of the secondary current source 42 may be provided as a constant amount to the LED group LED2, and the second currents ic3 and ic4 of the secondary current sources 43 and 44 may gradually increase in response to the changes of the rectified voltage Vrec, and flow into current paths passing through the LED groups LED3 and LED4, the switching circuits 33 and 34 of the driving circuit 30, and the sensing resistor Riset, respectively. The second current ic2 may contribute to the primary light emission of the LED group LED2, and the LED groups LED3 and LED4 may secondarily emit light using the second currents ic3 and ic4.

That is, the first current i2 and the second current ic2 may flow into the current path passing through the LED group LED2, the switching circuit 32 of the driving circuit 30, and the sensing resistor Riset. Furthermore, the first current i2 supplied to the LED group LED2 may decrease by the amount of the distributed second currents ic3 and ic4 of the secondary current sources 43 and 44. That is, the decrease of the first current i2 after the rectified voltage Vrec reaches the light emission voltage V2 may slow down, compared to the decrease of the first current i1 after the rectified voltage Vrec reaches the light emission voltage V1.

The LED groups LED1 and LED2 may primarily emit light at a luminance corresponding to the change of the first current i2, and the LED groups LED3 and LED4 may secondarily emit light at luminances corresponding to the changes of the second currents ic3 and ic4.

Until the rectified voltage Vrec reaches the light emission voltage V3, the luminances of the LED groups LED1 and LED2 may gradually decrease in response to the change of the first current i2, and the luminances of the LED groups LED3 and LED4 may gradually increase in response to the changes of the second currents ic3 and ic4. That is, while the entire luminance is maintained, the optical deviation between the respective LED groups may be reduced.

Then, when the rectified voltage Vrec continuously rises to reach the light emission voltage V3, the LED group LED3 may primarily emit light. The first current i3 may be applied as a current for the primary light emission of the LED group LED3. When the LED group LED3 primarily emits light, the switching circuit 33 connected to the LED group LED3 may provide a current path for the primary light emission. At this time, the LED groups LED1 and LED2 may also maintain the light emitting state.

When the rectified voltage Vrec reaches the light emission voltage V3 such that the LED group LED3 primarily emits light and the current path is formed through the switching circuit 33, the level of the sensing voltage of the sensing resistor Riset may rise. At this time, the sensing voltage may have a higher level than the reference voltage VREF2. Therefore, the NMOS transistor 39b of the switching circuit 32 may be turned off by an output of the comparator 38b. That is, the switching circuit 32 may be turned off, and the switching circuit 33 may provide a current path corresponding to the primary light emission of the LED group LED3.

Furthermore, when the rectified voltage Vrec reaches the light emission voltage V3, the voltage for the primary light emission of the LED group LED3, that is, the light emission voltage V3 may be applied between the collector and emitter of the NPN transistor Q3 of the secondary current source 43. Although the rectified voltage Vrec rises over the light emission voltage V3, the state in which the light emission voltage V3 is applied may be maintained between the collector and emitter of the NPN transistor Q3 of the secondary current source 43. That is, although the rectified voltage Vrec rises over the light emission voltage V3, the fixed voltage may be applied to the secondary current source 43. Thus, the secondary current source 43 may provide the constant amount of second current ic3. On the other hand, the secondary current source 44 may provide the second current ic4 which increases in response to the change of the rectified voltage Vrec, until the rectified voltage Vrec reaches the light emission voltage V4 of the LED group LED4 coupled thereto.

As described above, when the rectified voltage Vrec rises to the light emission voltage V4 after reaching the light emission voltage V3, the first current i3 may flow into a current path passing through the LED group LED3, the switching circuit 33 of the driving circuit 30, and the sensing resistor Riset, in response to the primary light emission of the LED group LED3. At this time, the first currents i1 and i2 may follow the increased amount of the first current i3.

Simultaneously, the second current ic3 of the secondary current source 43 may be provided as a constant amount to the LED group LED3, and the second current ic4 of the secondary current source 44 may flow into a current path passing through the LED group LED4, the switching circuit 34 of the driving circuit 30, and the sensing resistor Riset, while gradually increasing.

That is, the first current i3 for primary light emission and the second current ic3 may flow into the current path passing through the LED group LED3, the switching circuit 33 of the driving circuit 30, and the sensing resistor Riset. Furthermore, the first current i3 supplied to the LED group LED3 may decrease by the amount of the distributed second current ic4 of the secondary current source 44. That is, the decrease of the first current i3 after the rectified voltage Vrec reaches the light emission voltage V3 may slow down, compared to the decrease of the first current i2 after the rectified voltage Vrec reaches the light emission voltage V2.

The LED groups LED1 to LED3 may primarily emit light at a luminance corresponding to the change of the first current i3, and the LED groups LED3 and LED4 may secondarily emit light at a luminance corresponding to the change of the second current ic4.

Until the rectified voltage Vrec reaches the light emission voltage V4, the luminance of the LED groups LED1 to LED3 may gradually decrease in response to the change of the first current i3, and the luminance of the LED group LED4 may gradually increase in response to the change of the second current ic4. That is, while the entire luminance is maintained, the optical deviation between the respective LED groups may be reduced.

Then, when the rectified voltage Vrec continuously rises to reach the light emission voltage V4, the LED group LED4 may primarily emit light. The first current i4 may be applied as a current for the primary light emission of the LED group LED4. When the LED group LED4 emits light, the switching circuit 34 connected to the LED group LED4 may provide a current path for the primary light emission. At this time, the LED groups LED1 to LED3 may also maintain the light emitting state.

When the rectified voltage Vrec reaches the light emission voltage V4 such that the LED group LED4 primarily emits light and the current path is formed through the switching circuit 34, the level of the sensing voltage of the sensing resistor Riset may rise. At this time, the sensing voltage may have a higher level than the reference voltage VREF3. Therefore, the NMOS transistor 39c of the switching circuit 33 may be turned off by an output of the comparator 38c. That is, the switching circuit 33 may be turned off, and the switching circuit 34 may provide a current path corresponding to the primary light emission of the LED group LED4.

Furthermore, when the rectified voltage Vrec reaches the light emission voltage V4, the light emission voltage V4 may be applied between the collector and emitter of the NPN transistor Q4 of the secondary current source 44. Although the rectified voltage Vrec rises over the light emission voltage V4, the light emission voltage V4 may be applied between the collector and emitter of the NPN transistor Q4 of the secondary current source 44. That is, although the rectified voltage Vrec rises over the light emission voltage V4, the fixed voltage may be applied to the secondary current source 44. Thus, the secondary current source 44 may provide the constant amount of second current ic4.

As described above, after the rectified voltage Vrec reaches the light emission voltage V4, the first current i4 may flow into a current path passing through the LED group LED4, the switching circuit 34 of the driving circuit 30, and the sensing resistor Riset, in response to the primary light emission of the LED group LED4.

That is, the first current i4 and the second current ic4 may flow into the current path passing through the LED group LED4, the switching circuit 34 of the driving circuit 30, and the sensing resistor Riset. The sum of the first current i4 and the second current ic4 may be maintained at a constant amount. Thus, the LED groups LED1 to LED4 may primarily emit light at a predetermined luminance corresponding to the sum of the first current i3 and the second current ic4.

In accordance with the embodiment of the present invention, the optical deviation between the respective LED groups may be reduced while the entire luminance is maintained, in response to the rise of the rectified voltage Vrec.

Then, when the rectified voltage Vrec falls, the switching circuits 34 to 31 connected to the LED groups LED4 to LED1 may be sequentially turned off, and the first current provided to the lighting unit 20 may gradually decrease in order of i4, i3, i2, and i1. Then, the LED groups to which the first current is not provided may perform secondary light emission through the operations of the secondary current sources 44 to 42.

At this time, each of the secondary current sources 42 to 44 may provide a secondary current having a decreasing slope, when the rectified voltage Vrec is lower than the level at which the first current can reach the LED group coupled thereto, after the rectified voltage Vrec becomes lower than the light emission voltage of the LED group coupled thereto. Then, the first currents i1 to i3 may gradually decrease while having a waveform which repetitively increases and decreases in inverse proportion to the decrease of the second current(s). As a result, the optical deviation between the respective LED groups LED1 to LED4 may be reduced in response to the decrease of the rectified voltage Vrec.

Figure 5:
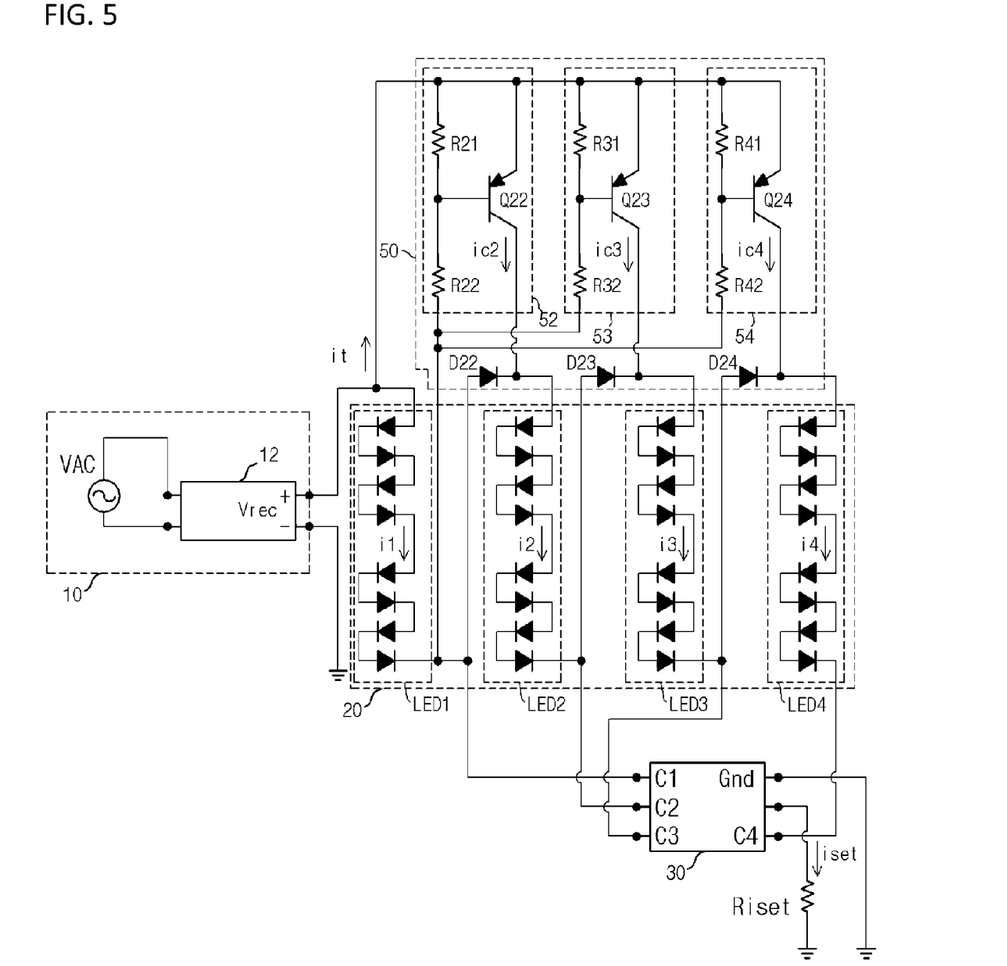
FIG. 5 is a block diagram illustrating a lighting apparatus in accordance with another embodiment of the present invention.
Figure 6:
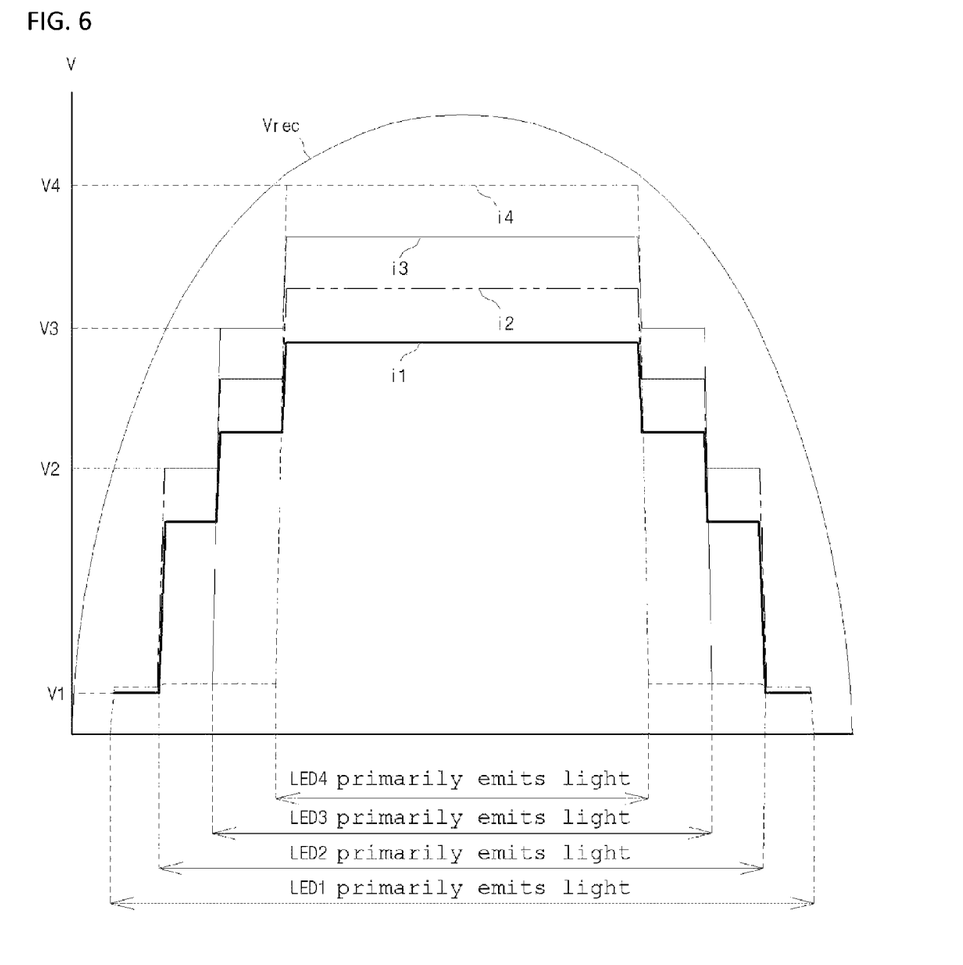
FIG. 6 is a waveform diagram for describing an input current for each LED group corresponding to a rectified voltage in accordance with the embodiment of FIG. 5.
Figure 7:
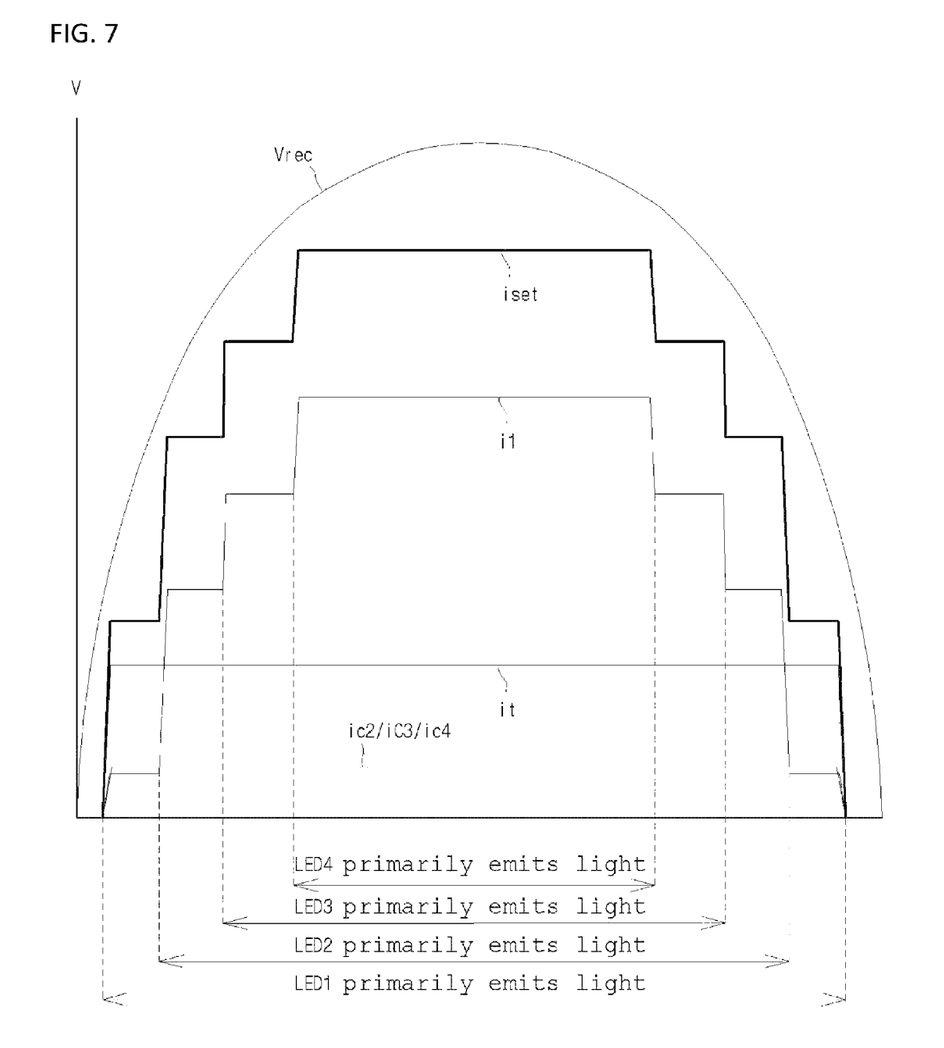
FIG. 7 is a waveform diagram illustrating secondary currents, an input current of a lighting unit, and a sensing current in accordance with the embodiment of FIG. 5.

FIG. 5 illustrates a lighting apparatus in accordance with another embodiment of the present invention. The embodiment of FIG. 5 may include a secondary current circuit 50 instead of the secondary current circuit 40, compared to the embodiment of FIG. 1. In the embodiment of FIG. 5, the descriptions of the configurations and operations of parts similar to those of FIG. 1 are omitted.

The secondary current circuit 50 may include secondary current sources 52 to 54 coupled to the LED groups LED2 to LED4 excluding the LED group LED1 which first emits light, among the LEDs LED1 to LED4. Unlike the configuration of FIG. 5, a secondary current source may be coupled only to the LED groups LED3 and LED4 or the LED group LED4. This configuration may be determined in consideration of an optical deviation, according to a designer's intention.

Each of the LED groups coupled to the secondary current sources may perform primary light emission using first and second currents in response to a rectified voltage having a level which the first current provided through the LED group LED1 can reach, and perform secondary light emission using the second current in response to a rectified voltage having a lower level than the level which the first current can reach.

The secondary current sources 52 to 54 may provide the second current to the respective LED groups LED2 to LED4 coupled thereto, through the operations of the PNP transistors Q22 to Q24 to which the rectified voltage Vrec is applied. Each of the secondary current sources 52 to 54 may be configured to provide a constant amount of second current corresponding to the light emission voltage V1 of the LED group LED1 while the LED group LED1 maintains light emission.

That is, each of the secondary current sources 52 to 54 may be configured to provide a constant amount of secondary current corresponding to the light emission voltage V1 of the LED group LED1 while the rectified voltage Vrec is maintained at more than the light emission voltage V1 of the LED group LED1 which first light emits. The point of time that the supply of the second current is started may be set to various points by a designer, regardless of the light emission voltage of the LED group LED1.

Representatively, the secondary current source 52 may include a PNP transistor Q22, a resistor R22 configured to receive the rectified voltage Vrec, and a resistor R21 connected an output terminal of the LED group LED1. The PNP transistor Q22 may include an emitter configured to receive the rectified voltage Vrec, a base connected to a node between the resistor R21 and the resistor R22, and a collector connected to an input terminal of the LED group LED1. The secondary current sources 53 and 54 may also include PNP transistors Q23 and Q24, resistors R31 and R32 and R41 and R41, respectively, and have the same configuration as the secondary current source 52. Thus, the duplicate descriptions thereof are omitted herein.

The operation of the lighting apparatus in accordance with the embodiment of FIG. 5 will be described with reference to FIGS. 5 to 7 and FIG. 2.

When the rectified voltage Vrec is in the initial state, the switching circuits 31 to 34 may maintain a turn-on state because the reference voltages VREF1 to VREF4 applied to the positive input terminals (+) thereof are higher than the sensing voltage of the resistor Riset, which is applied to the negative input terminals (−) thereof.

When the rectified voltage Vrec is in the initial state, the LED groups LED1 to LED4 may not emit light, and the secondary current sources 52 to 54 may not supply the second current either, because the turn-on condition is not satisfied.

Then, when the rectified voltage Vrec rises to reach the light emission voltage V1, the LED group LED1 may primarily emit light. Then, when the LED group LED1 of the lighting unit 20 primarily emits light, the switching circuit 31 connected to the LED group LED1 may provide a current path for the primary light emission.

When the rectified voltage Vrec reaches the light emission voltage V1 such that the LED group LED1 primarily emits light and the current path is formed through the switching circuit 31, the first current i1 increased to a predetermined level may be supplied to the LED group LED1.

Furthermore, when the rectified voltage Vrec reaches the light emission voltage V1, the secondary current sources 52 to 54 may start supplying the second currents ic2 to ic4, because the turn-on condition is satisfied. Each of the secondary current sources 52 to 54 may be configured to provide a constant amount of second current corresponding to the light emission voltage V1 of the LED group LED1 while the LED group LED1 maintains light emission.

That is, each of the secondary current sources 52 to 54 may be configured to provide the constant amount of second current corresponding to the light emission voltage V1 of the LED group LED1 while the rectified voltage Vrec is maintained at more than the light emission voltage V1 of the LED group LED1. The second current ic2 provided from the secondary current source 52 may be determined by a resistance value, and defined as Equation 1 below.

$$ic2 = i_B \times hfe = \frac{V1}{R} \times hfe \quad \text{[Equation 1]}$$

In Equation 1, $i_B$ represents a base current, hfe represents a current amplification factor of the transistor Q2, V1 represents the light emission voltage of the LED group LED1, and R represents a resistance value applied to the base and determined by the resistors R21 and R22. That is, the second current ic2 may have a constant value.

The second currents ic3 and ic4 of the secondary current sources 53 and 54 may be calculated in the same manner as Equation 1. When the resistance value is equal or different, the second currents ic3 and ic4 may be provided as the same amount as or a different amount from the second current ic2.

Although the rectified voltage Vrec reaches the light emission voltage V1 such that the LED group LED1 primarily emits light, the turn-on states of the switching circuits 31 to 34 may not be changed because the level of the sensing voltage of the sensing resistor Riset is low.

In response to the primary light emission of the LED group LED1, the first current i1 may flow into a path passing through the LED group LED1, the switching circuit 31 of the driving circuit 30, and the sensing resistor Riset.

Simultaneously, the second currents ic2 to ic4 of the secondary current sources 52 to 54 may flow into paths passing through the respective LED groups LED2 to LED4, the respective switching circuits 32 to 34 of the driving circuit 30, and the sensing resistor Riset, respectively. The LED groups LED2 to LED4 may secondarily emit light using the second currents ic2 to ic4.

Then, although the rectified voltage Vrec continuously rises, the second currents ic2 to ic4 of the secondary current sources 52 to 54 may be maintained at a constant amount, and the first current i1 supplied to the LED group LED1 may be maintained at a constant amount.

However, the luminance of the LED group LED1 may be reduced by the amount of the distributed second currents ic2 to ic4 of the secondary current sources 52 to 54. That is, while the entire luminance is maintained, an optical deviation between the respective LED groups may be reduced.

Then, when the rectified voltage Vrec continuously rises to reach the light emission voltage V2, the LED group LED2 may primarily emit light. When the LED group LED2 primarily emits light, the switching circuit 32 connected to the LED group LED2 may provide a current path for the primary light emission. At this time, the LED group LED1 may also maintain the light emitting state.

When the rectified voltage Vrec reaches the light emission voltage V2 such that the LED group LED2 primarily emits light and the current path is formed through the switching circuit 32, the level of the sensing voltage of the sensing resistor Riset may rise. At this time, the sensing voltage may have a higher level than the reference voltage VREF1. Therefore, the NMOS transistor 39a of the switching circuit 31 may be turned off by an output of the comparator 38a. That is, the switching circuit 31 may be turned off, and the switching circuit 32 may provide a current path corresponding to the primary light emission of the LED group LED2.

Although the rectified voltage Vrec rises over the light emission voltage V2, the secondary current sources 52 to 54 may provide the constant amount of second currents ic2 to ic4 corresponding to the light emission voltage V1.

As described above, when the rectified voltage Vrec rises to the light emission voltage V3 after rising to the light emission voltage V2, the first current i2 may flow into a current path passing through the LED group LED2, the switching circuit 32 of the driving circuit 30, and the sensing resistor Riset, in response to the primary light emission of the LED group LED2. At this time, the first current i1 may follow the increased amount of the first current i2.

Simultaneously, the secondary current sources 52 to 54 may provide the constant amount of second currents ic2 to ic4 corresponding to the light emission voltage V1.

That is, the first current i2 for primary light emission and the second current ic2 may flow into the current path passing through the LED group LED2, the switching circuit 32 of the driving circuit 30, and the sensing resistor Riset.

However, the luminance of the LED group LED2 may be reduced by the amount of the distributed second currents ic3 and ic4 of the secondary current sources 53 and 54. That is, while the entire luminance is maintained, the optical deviation between the respective LED groups may be reduced.

Then, when the rectified voltage Vrec continuously rises to reach the light emission voltage V3, the LED group LED3 may primarily emit light. When the LED group LED3 primarily emits light, the switching circuit 33 connected to the LED group LED3 may provide a current path for the primary light emission. At this time, the LED groups LED1 and LED2 may also maintain the light emitting state.

When the rectified voltage Vrec reaches the light emission voltage V3 such that the LED group LED3 primarily emits light and the current path is formed through the switching circuit 33, the level of the sensing voltage of the sensing resistor Riset may rise. At this time, the sensing voltage may have a higher level than the reference voltage VREF2. Therefore, the NMOS transistor 39b of the switching circuit 32 may be turned off by an output of the comparator 38b. That is, the switching circuit 32 may be turned off, and the switching circuit 33 may provide a current path corresponding to the primary light emission of the LED group LED3.

Although the rectified voltage Vrec rises over the light emission voltage V3, the secondary current sources 52 to 54 may provide the constant amount of second currents ic2 to ic4 corresponding to the light emission voltage V1.

As described above, when the rectified voltage Vrec rises to the light emission voltage V4 after reaching the light emission voltage V3, the first current i3 may flow into a current path passing through the LED group LED3, the switching circuit 33 of the driving circuit 30, and the sensing resistor Riset, in response to the light emission of the LED group LED3. At this time, the first currents i1 and i2 may follow the increased amount of the first current i3.

Simultaneously, the secondary current sources 52 to 54 may provide the constant amount of second currents ic2 to ic4 corresponding to the light emission voltage V1.

That is, the first current i3 for primary light emission and the second current ic3 may flow into the current path passing through the LED group LED3, the switching circuit 33 of the driving circuit 30, and the sensing resistor Riset.

However, the luminance of the LED group LED3 may be reduced by the amount of the distributed second current ic4 of the secondary current sources 54 and 54. That is, while the entire luminance is maintained, the optical deviation between the respective LED groups may be reduced.

Then, when the rectified voltage Vrec continuously rises to reach the light emission voltage V4, the LED group LED4 may primarily emit light. When the LED group LED4 primarily emits light, the switching circuit 34 connected to the LED group LED4 may provide a current path for the primary light emission. At this time, the LED groups LED1 to LED3 may also maintain the light emitting state.

When the rectified voltage Vrec reaches the light emission voltage V4 such that the LED group LED4 primarily emits light and the current path is formed through the switching circuit 34, the level of the sensing voltage of the sensing resistor Riset may rise. At this time, the sensing voltage may have a higher level than the reference voltage VREF3. Therefore, the NMOS transistor 39c of the switching circuit 33 may be turned off by an output of the comparator 38c. That is, the switching circuit 33 may be turned off, and the switching circuit 34 may provide a current path corresponding to the primary light emission of the LED group LED4.

Simultaneously, the secondary current sources 52 to 54 may provide the constant amount of second currents ic2 to ic4 corresponding to the light emission voltage V1.

As described above, after the rectified voltage Vrec reaches the light emission voltage V4, the first current i4 may flow into a current path passing through the LED group LED4, the switching circuit 34 of the driving circuit 30, and the sensing resistor Riset, in response to the light emission of the LED group LED4. At this time, the first currents i1 to i3 may follow the increased amount of the first current i4.

That is, the first current i4 and the second current ic4 may flow into the current path passing through the LED group LED4, the switching circuit 34 of the driving circuit 30, and the sensing resistor Riset, for primary light emission. The sum of the first current i4 and the second current ic4 may be maintained at a constant amount. Thus, the LED groups LED1 to LED4 may have a constant luminance corresponding to the sum of the first current i4 and the second current ic4.

In accordance with the embodiment of the present invention, the optical deviation between the respective LED groups may be reduced while the entire luminance is maintained, in response to the rises of the rectified voltage Vrec.

Then, when the rectified voltage Vrec falls to sequentially release the primary light emissions in order of the LED groups LED4, LED3, LED2, and LED1, the lighting apparatus in accordance with the embodiment of the present invention may perform light emission in which the optical deviation between the respective LED groups is reduced through the operations of the secondary current sources 44 to 42. In response to the fall of the rectified voltage Vrec, the secondary current sources 42 to 44 may provide the constant amount of second current while the LED group LED1 maintains light emission, and not provide the second current when the LED group LED1 is turned off.

As described above, the embodiments of the present invention can reduce the optical deviation between the LED groups which emit light in response to one cycle of rectified voltage Vrec, thereby reducing the optical deviation in the entire light emission of the lighting apparatus.

Furthermore, even when one or more LED groups emit light using the rectified voltage of which the phase angle is controlled through the dimmer, the lighting apparatus can reduce an optical deviation which may occur as the LED groups unstably emit light in response to the phase angle, thereby reducing the optical deviation in the entire light emission of the lighting apparatus.

Furthermore, the lighting apparatus may provide a current path for secondary light emission as well as a current path for primary light emission of the lighting unit, and reduce the optical deviation through light emissions of the LED groups using one or more current paths.

Furthermore, as the current corresponding to the rectified voltage is distributed into the lighting unit and the secondary current circuit, the lighting apparatus can reduce the optical deviation corresponding to dimming and one cycle of rectified voltage.

While various embodiments have been described above, it will be understood to those skilled in the art that the embodiments described are by way of example only. Accordingly, the disclosure described herein should not be limited based on the described embodiments.

What is claimed is:

1. A lighting apparatus comprising:
   a lighting unit comprising a plurality of LED groups each having one or more LEDs and configured to emit light in response to a rectified voltage, the plurality of LED groups including a first LED group which first emits light in response to the rectified voltage and provides a path for a first current;

a driving circuit configured to provide one or more current paths to the plurality of LED groups, the one or more current paths being changed in response to a change of the rectified voltage; and one or more secondary current sources coupled to one or more of the plurality of LED groups excluding the first LED group, and each configured to provide a second current which differs according to the change of the rectified voltage, wherein the rectified voltage is distributed and supplied to the lighting unit and the secondary current source, and wherein the LED group coupled to the secondary current source performs primary light emission using the first current and the second current in response to the rectified voltage having a level equal to or more than the level which the first current provided through the first LED group reaches, and performs secondary light emission using the second current in response to the rectified voltage having a lower level than the level for the primary light emission.

2. The lighting apparatus of claim 1, wherein the secondary current source provides the second current at the same time as the first LED group emits light or after the first LED group emits light.

3. The lighting apparatus of claim 1, wherein the driving circuit performs current regulation on the current path.

4. The lighting apparatus of claim 1, wherein the secondary current source provides a constant amount of second current while the level of the rectified voltage is maintained at more than the level at which the first current reaches the LED group coupled thereto, and provides the second current which increases or decreases in response to the change of the rectified voltage when the level of the rectified voltage is lower than the level at which the first current reaches the LED group coupled thereto.

5. The lighting apparatus of claim 4, wherein the secondary current source provides the constant amount of second current corresponding to the level of the rectified voltage, at which the first current reaches the LED group coupled thereto, when the level of the rectified voltage is maintained at more than the level at which the first current reaches the LED group coupled thereto.

6. The lighting apparatus of claim 1, wherein the secondary current source provides a constant amount of second current while the level of the rectified voltage is maintained at more than the level at which the first current reaches the LED group coupled thereto.

7. The lighting apparatus of claim 1, wherein each of the secondary current sources is coupled to two or more LED groups, and provides the second current while the level of the rectified voltage is maintained at more than the level at which the first current reaches the LED group coupled thereto.

8. The lighting apparatus of claim 1, wherein the secondary current source provides the second current in response to a preset voltage.

9. The lighting apparatus of claim 8, wherein the secondary current source provides the second current using a voltage applied to the first LED group.

10. A lighting apparatus comprising:

a lighting unit comprising a plurality of LED groups each having one or more LEDs, and configured to emit light in response to a rectified voltage, the plurality of LED groups including a first LED group which first emits light in response to the rectified voltage and provides a path for a first current;

a driving circuit configured to provide one or more current paths to the plurality of LED groups, the one or more current paths being changed in response to a change of the rectified voltage; and one or more secondary current sources coupled to one or more of the plurality of LED groups excluding the first LED group, and each configured to provide a constant amount of second current in response to the rectified voltage having a level at which the first current provided through the first LED group reaches the LED group coupled thereto, and provide the second current which increases or decreases in response to a change of the rectified voltage having a lower level than the level at which the first current reaches the LED group coupled thereto, wherein the rectified voltage is distributed and supplied to the lighting unit and the secondary current source, and wherein the LED group coupled to the secondary current source performs primary light emission using the first current and the second current in response to the level of the rectified voltage equal to or more than the level which the first current reaches, and performs secondary light emission using the second current in response to the rectified voltage lower than the level which the first current reaches.

11. The lighting apparatus of claim 10, wherein the secondary current source provides the second current at the same time as the first LED group emits light or after the first LED group emits light.

12. The lighting apparatus of claim 10, wherein the driving circuit performs current regulation on the current path.

13. A lighting apparatus comprising:

a lighting unit comprising a plurality of LED groups each having one or more LEDs, and configured to emit light in response to a rectified voltage, the plurality of LED groups including a first LED group which first emits light in response to the rectified voltage and provides a path for a first current;

a driving circuit configured to provide one or more current paths to the plurality of LED groups, the one or more current paths being changed in response to a change of the rectified voltage; and one or more secondary current sources coupled to one or more of the plurality of LED groups excluding the first LED group, and each configured to provide a constant amount of second current, wherein the rectified voltage is distributed and supplied to the lighting unit and the secondary current source, and wherein the LED group coupled to the secondary current source performs primary light emission using the first current and the second current in response to the rectified voltage having a level equal to or more than the level which the first current provided through the first LED group reaches, and performs secondary light emission using the second current in response to the rectified voltage having a lower level than the level which the first current reaches.

14. The lighting apparatus of claim 13, wherein the secondary current source provides the second current at the same time as the first LED group emits light or after the first LED group emits light.

15. The lighting apparatus of claim 13, wherein the driving circuit performs current regulation on the current path.

16. The lighting apparatus of claim 13, wherein the secondary current source provides the second current using a voltage applied to the first LED group.

* * * * *